United States Patent
Oe et al.

(10) Patent No.: US 8,337,086 B2
(45) Date of Patent: Dec. 25, 2012

(54) BEARING APPARATUS, SPINDLE MOTOR, AND DISK DRIVE APPARATUS

(75) Inventors: Takayuki Oe, Kyoto (JP); Teiichi Hirono, Kyoto (JP); Kunio Sakurada, Kyoto (JP); Junya Mizukami, Kyoto (JP)

(73) Assignee: Nidec Corporation, Kyoto (JP)

( * ) Notice: Subject to any disclaimer, the term of this patent is extended or adjusted under 35 U.S.C. 154(b) by 349 days.

(21) Appl. No.: 12/793,851

(22) Filed: Jun. 4, 2010

(65) Prior Publication Data

US 2010/0321823 A1   Dec. 23, 2010

(30) Foreign Application Priority Data

Jun. 18, 2009   (JP) .................. 2009-145356

(51) Int. Cl.
*F16C 32/06*   (2006.01)
(52) U.S. Cl. .................. 384/100; 384/107; 384/119
(58) Field of Classification Search .................. 384/100, 384/107, 114, 120, 121, 123; 360/99.07, 360/99.08
See application file for complete search history.

(56) References Cited

U.S. PATENT DOCUMENTS

| | | | |
|---|---|---|---|
| 5,533,811 A | 7/1996 | Polch et al. | |
| 5,558,443 A | 9/1996 | Zang | |
| 6,211,592 B1 | 4/2001 | Ichiyama | |
| 6,246,136 B1 | 6/2001 | Ichiyama | |
| 7,215,508 B2 * | 5/2007 | Ishikawa et al. | 360/99.08 |
| 7,825,557 B2 * | 11/2010 | Drautz et al. | 310/90 |
| 2004/0156568 A1 | 8/2004 | Woldemar et al. | |
| 2004/0165797 A1 | 8/2004 | Oku et al. | |
| 2004/0175062 A1 | 9/2004 | Nishimura et al. | |
| 2004/0223672 A1 * | 11/2004 | Satoh | 384/107 |
| 2005/0031237 A1 | 2/2005 | Gomyo et al. | |
| 2005/0111769 A1 | 5/2005 | Haga | |
| 2005/0225187 A1 | 10/2005 | Hafen et al. | |
| 2006/0002638 A1 | 1/2006 | Ichiyama | |
| 2006/0002641 A1 | 1/2006 | Ichiyama | |
| 2006/0039634 A1 | 2/2006 | Ichiyama | |
| 2006/0039636 A1 | 2/2006 | Ichiyama | |

(Continued)

FOREIGN PATENT DOCUMENTS

CN   1532430 A   9/2004

(Continued)

OTHER PUBLICATIONS

Official Communication issued in International Patent Application No. PCT/JP2009/059556, mailed on Jul. 7, 2009.

(Continued)

*Primary Examiner* — Phillip A Johnson
(74) *Attorney, Agent, or Firm* — Keating & Bennett, LLP

(57) ABSTRACT

A bearing apparatus includes a shaft, a thrust cup including an annular potion and a cylindrical portion, a rotating member including a through hole defined therein, and a lubricating oil. A second gap defined between a lower surface of the rotating member and an upper surface of the annular portion of the thrust cup includes a first region in communication with a capillary seal portion, and a second region positioned radially inward of the first region and having an axial dimension smaller than that of the first region. A lower end portion of the through hole is open at a location radially outwardly away from a boundary between the first and second regions, so that a local circulation of the lubricating oil arises within the first region during rotation of the rotating member.

26 Claims, 11 Drawing Sheets

U.S. PATENT DOCUMENTS

| | | |
|---|---|---|
| 2006/0051001 A1 | 3/2006 | Nishimura et al. |
| 2006/0210205 A1 | 9/2006 | Engesser et al. |
| 2006/0222276 A1 | 10/2006 | Uenosono |
| 2007/0140606 A1 | 6/2007 | Feng et al. |
| 2007/0154123 A1 | 7/2007 | Gomyo et al. |
| 2007/0177832 A1 | 8/2007 | Gotoh et al. |
| 2007/0211971 A1 | 9/2007 | Obara et al. |
| 2008/0056104 A1 | 3/2008 | Nishimura et al. |
| 2009/0129710 A1 | 5/2009 | Ito et al. |
| 2009/0140587 A1 | 6/2009 | Popov et al. |
| 2009/0140588 A1 | 6/2009 | Drautz et al. |
| 2009/0279818 A1 | 11/2009 | Le et al. |

FOREIGN PATENT DOCUMENTS

| | | |
|---|---|---|
| CN | 1906424 A | 1/2007 |
| JP | 06-121484 A | 4/1994 |
| JP | 07-336924 A | 12/1995 |
| JP | 2000-014079 A | 1/2000 |
| JP | 2002-005171 A | 1/2002 |
| JP | 2003-092867 A | 3/2003 |
| JP | 2003-139129 A | 5/2003 |
| JP | 2003-244886 A | 8/2003 |
| JP | 2004-173377 A | 6/2004 |
| JP | 2005-016556 A | 1/2005 |
| JP | 2005-048890 A | 2/2005 |
| JP | 2005-155689 A | 6/2005 |
| JP | 2005-304290 A | 10/2005 |
| JP | 2006-226388 A | 8/2006 |
| JP | 2006-283773 A | 10/2006 |
| JP | 2007-024267 A | 2/2007 |
| JP | 2007-155093 A | 6/2007 |
| JP | 2009-041671 A | 2/2009 |
| JP | 2009-133361 A | 6/2009 |
| JP | 2009-136143 A | 6/2009 |
| WO | 2006/120719 A1 | 11/2006 |

OTHER PUBLICATIONS

Kimura et al.: "Bearing Apparatus, Spindle Motor, and Disk Drive Apparatus"; U.S. Appl. No. 12/791,147, filed Jun. 1, 2010.

Yamada et al.: "Fluid Dynamic Bearing Apparatus, Spindle Motor, and Disk Drive Apparatus"; U.S. Appl. No. 12/742,931, filed May 14, 2010.

Kimura et al., "Dynamic Pressure Bearing and Spindle Motor Using the Same," U.S. Appl. No. 12/952,223, filed Nov. 23, 2010.

Yamada et al. "Fluid Dynamic Bearing Apparatus, Spindle Motor, and Disk Drive Apparatus," U.S. Appl. No. 12/899,658, filed Oct. 7, 2010.

Yamada et al., "Fluid Dynamic Bearing Apparatus, Spindle Motor, and Disk Drive Apparatus," U.S. Appl. No. 13/299,542, filed Nov. 18, 2011.

* cited by examiner

BEARING APPARATUS, SPINDLE MOTOR, AND DISK DRIVE APPARATUS

BACKGROUND OF THE INVENTION

1. Field of the Invention

The present invention relates to a bearing apparatus, a spindle motor, and a disk drive apparatus.

2. Description of the Related Art

Hard disk apparatuses and optical disk apparatuses are typically provided with a spindle motor arranged to rotate a disk or disks about a central axis thereof. The spindle motor includes a stationary portion fixed to a housing of the apparatus, and a rotating portion arranged to rotate while supporting the disk(s). The spindle motor is arranged to produce a torque centered on the central axis by magnetic flux generated between the stationary and rotating portions, whereby the rotating portion is caused to rotate with respect to the stationary portion.

The stationary and rotating portions of the spindle motor are joined to each other through a bearing apparatus. In recent years, in particular, spindle motors have often been provided with a bearing apparatus in which a lubricating fluid is arranged between the stationary and rotating portions. JP-A 2002-5171, for example, describes an example of such a bearing apparatus using the lubricating fluid. In the bearing apparatus described in JP-A 2002-5171, the lubricating fluid is arranged to fill a gap between a shaft and a sleeve which are rotatably supported with respect to each other.

However, such a bearing apparatus using the lubricating fluid will deteriorate in rotational performance if air bubbles enter into the lubricating fluid so that the air bubbles are accumulated in the gap between the shaft and the sleeve. In the case where grooves are defined in the shaft or the sleeve to generate a dynamic pressure, in particular, air bubbles may become accumulated in the vicinity of the grooves so as to make it difficult for the dynamic pressure to be successfully generated in the lubricating fluid. This makes it difficult to achieve a sufficient supporting force between the shaft and the sleeve.

SUMMARY OF THE INVENTION

According to a preferred embodiment of the present invention, a bearing apparatus includes a shaft arranged along a central axis extending in a vertical direction; a thrust cup including an annular portion and a cylindrical portion; a thrust washer; a rotating member arranged above the thrust cup; and a lubricating oil.

The rotating member preferably has a through hole extending in an axial direction defined therein. The lubricating oil is arranged to fill a space including the through hole, a first gap, a second gap, and a third gap.

At least one of an outer circumferential surface of the shaft and a portion of the rotating member which is arranged radially opposite to the outer circumferential surface of the shaft includes a plurality of dynamic pressure grooves arranged thereon to generate a dynamic pressure in a portion of the lubricating oil which is present in the first gap during rotation of the rotating member, and to cause the portion of the lubricating oil which is present in the first gap to flow upward in the first gap.

An outer circumferential surface of the rotating member and an inner circumferential surface of the cylindrical portion together define a lower capillary seal portion. The lower capillary seal portion has a lower surface of the lubricating oil located therewithin.

The second gap preferably includes a first region in communication with the lower capillary seal portion, and a second region positioned radially inward of the first region and having an axial dimension smaller than that of the first region.

The through hole has an upper end portion in communication with the first gap, and a lower end portion open at a location radially outwardly away from a boundary between the first and second regions.

An outer circumferential surface of the thrust washer and an inner circumferential surface of the rotating member together define an upper capillary seal portion. The upper capillary seal portion has an upper surface of the lubricating oil located therewithin.

A pumping groove is preferably arranged on at least one of an upper surface and the inner circumferential surface of the rotating member and the outer circumferential surface and a lower surface of the thrust washer to pump a portion of the lubricating oil in a vicinity of the upper surface of the lubricating oil toward an inside of the bearing apparatus.

According to this preferred embodiment of the present invention, a local circulation of the lubricating oil arises within the first region during the rotation of the rotating member. Accordingly, any air bubbles that have traveled through the lower end portion of the through hole into the first region will be carried toward the lower capillary seal portion, and then discharged out of the bearing apparatus through the lower surface of the lubricating oil within the lower capillary seal portion.

These and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings. A cup-shaped thrust member will be herein referred to as a "thrust cup". It is assumed herein that an upward/downward direction is defined along a central axis 9, and that a side on which a rotating member 141 or a hub 41 is arranged relative to a thrust cup 132 or 32 is defined as an upper side. The shape of each member and relative positions of different members will be described based on this assumption. It should be noted, however, that this definition of the upper/lower or upward/downward directions is simply applied to facilitate the description provided herein, and should not be construed to restrict in any way the orientation of a bearing apparatus, a spindle motor, or a disk drive apparatus according to any preferred embodiment of the present invention when actually installed in a device.

Figure 1:
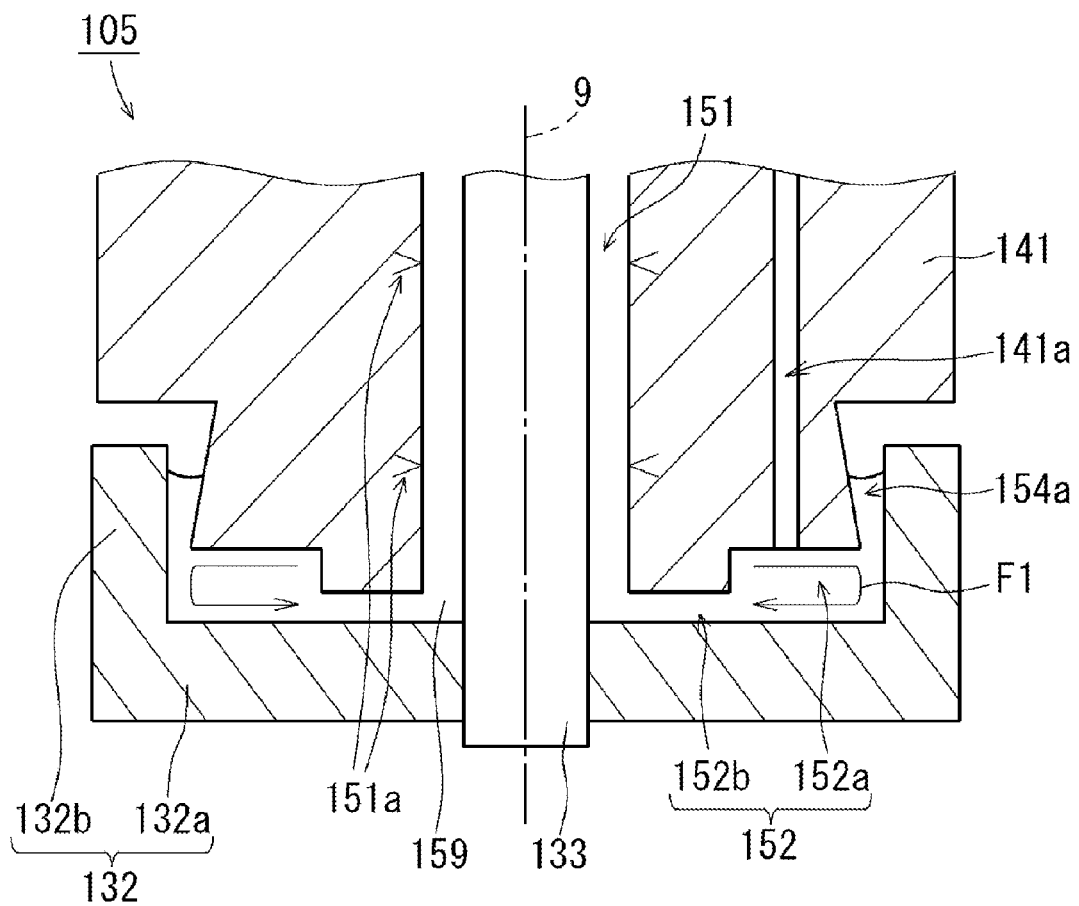
FIG. 1 is a diagram illustrating the structure of a bearing apparatus according to a preferred embodiment of the present invention.

FIG. 1 is a diagram illustrating the structure of a bearing apparatus 105 according to a preferred embodiment of the present invention. As illustrated in FIG. 1, the bearing apparatus 105 includes a shaft 133, the thrust cup 132, and the rotating member 141. The shaft 133 is arranged along the central axis 9 extending in a vertical direction. The thrust cup 132 includes an annular portion 132a fixed to an outer circumferential surface of the shaft 133, and a cylindrical portion 132b projecting upward from an outer edge portion of the annular portion 132a. The rotating member 141 is arranged above the thrust cup 132, and supported around the shaft 133 so as to be rotatable about the central axis 9.

The rotating member 141 preferably has a through hole 141a extending in a direction along the central axis 9 (hereinafter referred to as an "axial direction") defined therein. A lubricating oil 159 is arranged to fill a space including the through hole 141a, a first gap 151 defined between the outer circumferential surface of the shaft 133 and an inner circumferential surface of the rotating member 141, and a second gap 152 defined between a lower surface of the rotating member 141 and an upper surface of the annular portion 132a.

A plurality of dynamic pressure grooves 151a are defined in at least one of the outer circumferential surface of the shaft 133 and the inner circumferential surface of the rotating member 141 to generate a dynamic pressure in a portion of the lubricating oil 159 which is present in the first gap 151. The dynamic pressure grooves 151a are arranged to cause the portion of the lubricating oil 159 which is present in the first gap 151 to flow upward in the first gap 151 during rotation of the rotating member 141.

A capillary seal portion 154a is defined between an outer circumferential surface of the rotating member 141 and an inner circumferential surface of the cylindrical portion 132b. The capillary seal portion 154a is in communication with the second gap 152. The radial dimension of the capillary seal portion 154a gradually decreases in a downward direction. A surface of the lubricating oil 159 is located within the capillary seal portion 154a.

The second gap 152 includes a first region 152a in communication with the capillary seal portion 154a, and a second region 152b. The second region 152b is arranged radially inward of the first region 152a, and has a smaller axial dimension than that of the first region 152a. An upper end portion of the through hole 141a is in communication with the first gap 151, while a lower end portion of the through hole 141a is open at a location radially outwardly away from a boundary between the first and second regions 152a and 152b.

In the bearing apparatus 105 according to the present preferred embodiment, a local circulation F1 of the lubricating oil 159 is caused in the first region 152a during the rotation of the rotating member 141. This causes any air bubbles which have traveled through the lower end portion of the through hole 141a into the first region 152a to be carried toward the capillary seal portion 154a such that the air bubbles will be discharged out of the bearing apparatus through the surface of the lubricating oil 159 within the capillary seal portion 154a.

Next, a preferred embodiment of the present invention will now be described below in a greater detail.

Figure 2:
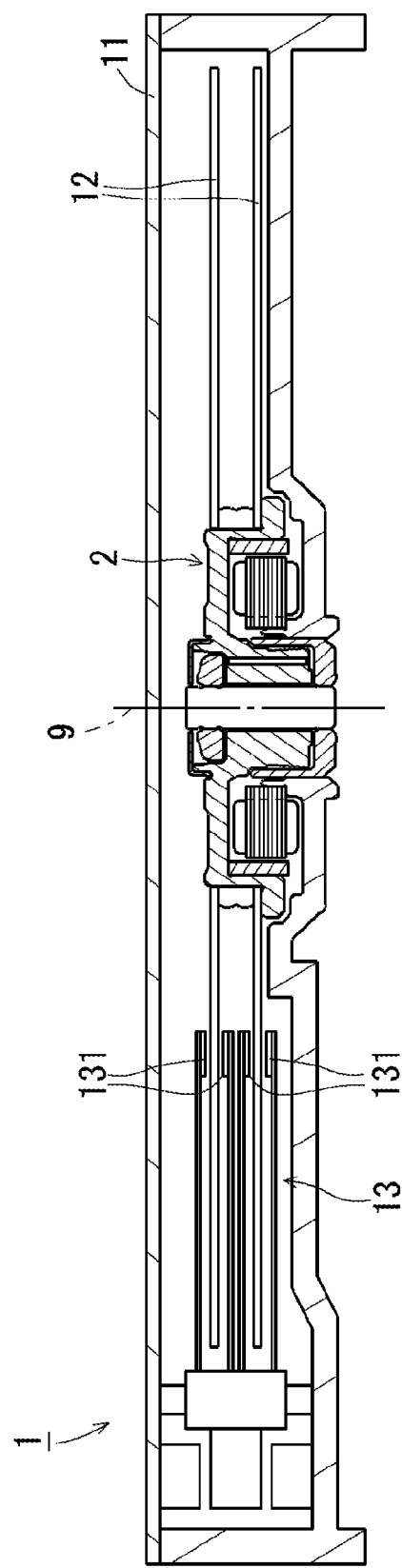
FIG. 2 is a vertical cross-sectional view of a disk drive apparatus according to a preferred embodiment of the present invention.

FIG. 2 is a vertical cross-sectional view of a disk drive apparatus 1 according to a preferred embodiment of the present invention. The disk drive apparatus 1 is designed to read and/or write information from or to magnetic disks 12 (hereinafter referred to simply as "disks 12"), for example, while rotating the disks 12. As illustrated in FIG. 2, the disk drive apparatus 1 preferably includes an apparatus housing 11, two disks 12, an access portion 13, and a spindle motor 2. Note that the number of disks 12 is not limited to two in other preferred embodiments.

The apparatus housing 11 is arranged to contain the two disks 12, the access portion 13, and the spindle motor 2. The access portion 13 includes heads 131, and is arranged to move any of the heads 131 along a recording surface of an associated one of the disks 12 supported by the spindle motor 2 to read and/or write information from or to the disk 12.

Figure 3:
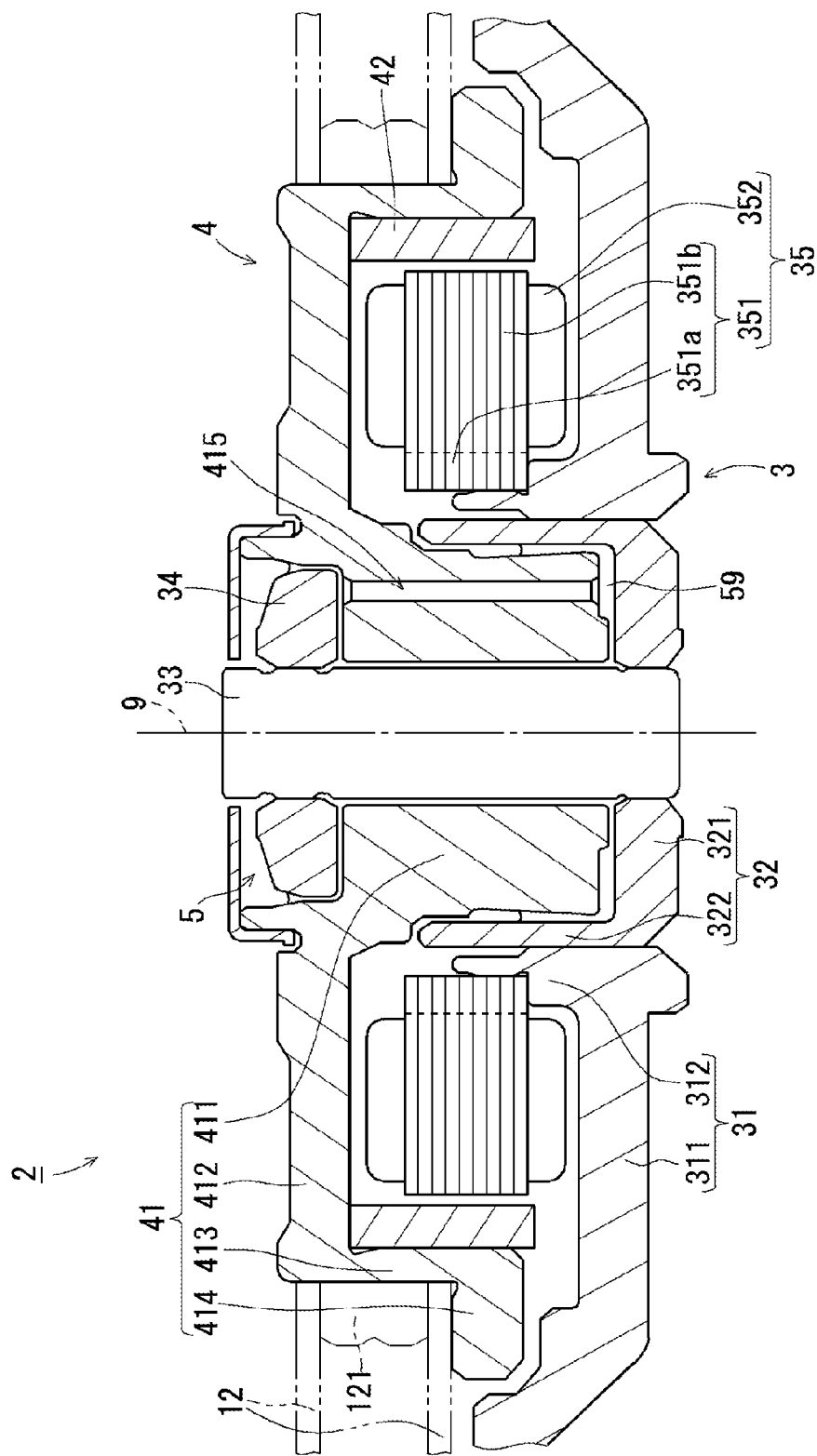
FIG. 3 is a vertical cross-sectional view of a spindle motor according to a preferred embodiment of the present invention.

Next, the structure of the spindle motor 2 will now be described below. FIG. 3 is a vertical cross-sectional view of the spindle motor 2. As illustrated in FIG. 3, the spindle motor 2 preferably includes a stationary portion 3 fixed to the apparatus housing 11 of the disk drive apparatus 1, and a rotating portion 4 arranged to rotate about the central axis 9 while supporting the disks 12.

The stationary portion 3 preferably includes a base member 31, the thrust cup 32, a shaft 33, a thrust washer 34, and a stator unit 35.

The base member 31 preferably defines a portion of the apparatus housing 11 of the disk drive apparatus 1 (see FIG. 2), and is provided integrally with a remaining portion of the apparatus housing 11. Note that the base member 31 and the apparatus housing 11 may also be defined by separate members in other preferred embodiments. The base member 31 preferably includes a radially extending plate portion 311, and a substantially cylindrical holder portion 312 projecting upward from an inner edge portion of the plate portion 311. The base member 31 is made, for example, of a metal such as an aluminum alloy or the like.

The thrust cup 32 preferably includes an annular portion 321 and a cylindrical portion 322 projecting upward from an outer edge portion of the annular portion 321. Preferably, the thrust cup 32 is substantially in the shape of a cup. The thrust cup 32 is fixed to the base member 31, with an outer circumferential surface of the cylindrical portion 322 in contact with an inner circumferential surface of the holder portion 312 of the base member 31. The annular portion 321 of the thrust cup 32 is fixed to a lower end portion of the shaft 33. The thrust cup 32 is preferably made of a metal, a resin, or the like.

The lower end portion of the shaft 33 is preferably press-fitted inside the annular portion 321 of the thrust cup 32, and at the same time fixed to the thrust cup 32 through an adhesive. However, the end portion of the shaft 33 could also be connected to the annular portion 321 of the thrust cup 32 in any other desirable manner. That is, the shaft 33 is fixed in relation to the base member 31 through the thrust cup 32. The shaft 33 is preferably made of a metal such as, for example, stainless steel or the like.

The thrust washer 34 is fixed to the shaft 33 at a level higher than that of the thrust cup 32. Preferably, the thrust washer 34 has a substantially annular shape. The thrust washer 34 is preferably press-fitted to the shaft 33 in the vicinity of an upper end portion thereof, and at the same time fixed to the shaft 33 through an adhesive. However, the thrust washer 34 could also be connected to the shaft 33 in any other desirable manner. The thrust washer 34 is preferably made, for example, of a metal, a resin, or the like.

In the present preferred embodiment, both the thrust cup 32 and the thrust washer 34 are defined by members separate from the shaft 33. Note, however, that the thrust cup 32 and/or the thrust washer 34 may be integral with the shaft 33 to together define a single member, in other preferred embodiments.

The stator unit 35 includes a stator core 351 and a plurality of coils 352. The stator unit 35 is arranged to generate magnetic flux in accordance with a drive current applied to the coils 352. The stator core 351 preferably includes an annular core back 351a and a plurality of tooth portions 351b projecting radially outward from the core back 351a. The core back 351a is fixed to an outer circumferential surface of the holder portion 312 of the base member 31. The stator core 351 is obtained, for example, by stamping out a plurality of magnetic steel sheets in the aforementioned shape, and placing the magnetic steel sheets one upon another in the axial direction. However, any other desirable stator core manufacturing process could be used. The coils 352 are preferably defined by a lead wire wound about each tooth portion 351b of the stator core 351.

The rotating portion 4 includes the hub 41 and a rotor magnet 42.

The hub 41 defines the rotating member, and is arranged around the shaft 33 to rotate about the central axis 9. The hub 41 includes a sleeve portion 411, a circular plate portion 412, an outer cylindrical portion 413, and a flange portion 414. The sleeve portion 411 is substantially in the shape of a cylinder, and has an inner circumferential surface arranged opposite to the outer circumferential surface of the shaft 33. Along the axial direction, the sleeve portion 411 is arranged between the annular portion 321 of the thrust cup 32 and the thrust washer 34. The circular plate portion 412 is preferably arranged to extend radially outward from an upper end portion of the sleeve portion 411. The outer cylindrical portion 413 is preferably arranged to extend downward from an outer edge portion of the circular plate portion 412. The flange portion 414 is preferably arranged to project radially outward from a lower end portion of the outer cylindrical portion 413.

An outer circumferential surface of the outer cylindrical portion 413 is arranged in contact with inner circumferential portions of the two disks 12. An upper surface of the flange portion 414 has the lower one of the disks 12 mounted thereon. While the lower disk 12 is mounted on the upper surface of the flange portion 414, the upper disk 12 is mounted on a spacer 121 arranged on the lower disk 12. The inner circumferential portion of each disk 12 is arranged in contact with the outer circumferential surface of the outer cylindrical portion 413, so that the radial position of each disk 12 is determined. The outer cylindrical portion 413 and the flange portion 414 are arranged to support the two disks 12 in the above-described manner.

The rotor magnet 42 is fixed to an inner circumferential surface of the outer cylindrical portion 413 of the hub 41. The rotor magnet 42 is in the shape of a ring centered on the central axis 9. An inner circumferential surface of the rotor magnet 42 is arranged radially opposite to outer circumferential surfaces of the tooth portions 351b of the stator core 351. The inner circumferential surface of the rotor magnet 42 defines a pole surface where the north and south poles alternate with each other.

A lubricating oil 59 is arranged in minute gaps defined between the thrust cup 32, the shaft 33, the thrust washer 34, and the hub 41. An upper surface of the lubricating oil 59 is located in a gap between an outer circumferential surface of the thrust washer 34 and an inner circumferential surface of the circular plate portion 412 of the hub 41. Meanwhile, a lower surface of the lubricating oil 59 is located in a gap defined between an inner circumferential surface of the cylindrical portion 322 of the thrust cup 32 and an outer circumferential surface of the sleeve portion 411 of the hub 41.

The sleeve portion 411 of the hub 41 has defined therein a through hole 415 extending from an upper surface to a lower surface thereof in the axial direction. An inside of the through hole 415 is filled with the lubricating oil 59. Examples of the lubricating oil 59 include, for example, oils containing an ester as a main component, such as polyester oil and diester oil.

The hub 41 is supported through the lubricating oil 59 to be rotatable with respect to the thrust cup 32, the shaft 33, and the thrust washer 34. That is, in the present preferred embodiment, the thrust cup 32, the shaft 33, the thrust washer 34, and the hub 41 together define a fluid dynamic bearing apparatus 5 arranged to join the stationary and rotating portions 3 and 4 to each other such that the stationary and rotating portions 3 and 4 are rotatable relative to each other.

Regarding the spindle motor 2 described above, when the drive current is applied to the coils 352 of the stationary portion 3, radial magnetic flux is generated about the tooth portions 351b of the stator core 351. Then, the magnetic flux of the tooth portions 351b and that of the rotor magnet 42 interact with each other to produce a circumferential torque, so that the rotating portion 4 is caused to rotate about the central axis 9 with respect to the stationary portion 3. The disks 12 supported by the hub 41 are also caused to rotate about the central axis 9 along with the hub 41.

Next, the lubricating oil 59 arranged between the stationary and rotating portions 3 and 4 will now be described below in a greater detail.

Figure 4:
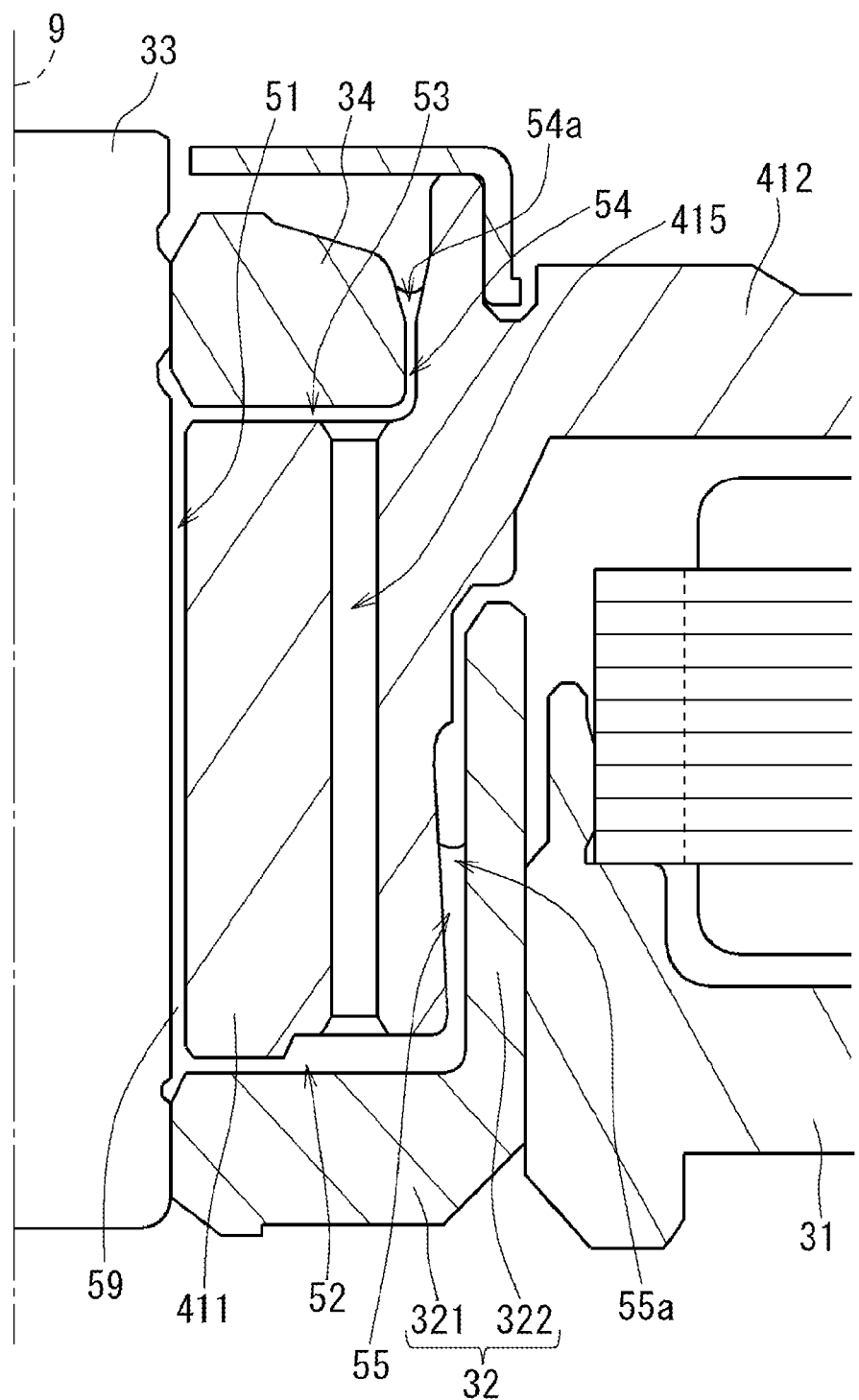
FIG. 4 is a vertical cross-sectional view of a thrust cup, a shaft, a thrust washer, a sleeve portion of a hub, and their vicinity, according to a preferred embodiment of the present invention.

FIG. 4 is a vertical cross-sectional view of the thrust cup 32, the shaft 33, the thrust washer 34, the sleeve portion 411 of the hub 41, and their vicinity. Referring to FIG. 4, a minute gap defined between the outer circumferential surface of the shaft 33 and an inner circumferential surface of the sleeve portion 411 will be hereinafter referred to as a "first gap" 51. A minute gap defined between a lower surface of the sleeve portion 411 and an upper surface of the annular portion 321 of the thrust cup 32 will be hereinafter referred to as a "second gap" 52. A minute gap defined between an upper surface of the sleeve portion 411 and a lower surface of the thrust washer 34 will be hereinafter referred to as a "third gap" 53. The first gap 51, the second gap 52, the third gap 53, and the through hole 415 define mutually communicating spaces, and these spaces are filled with the lubricating oil 59.

Figure 5:
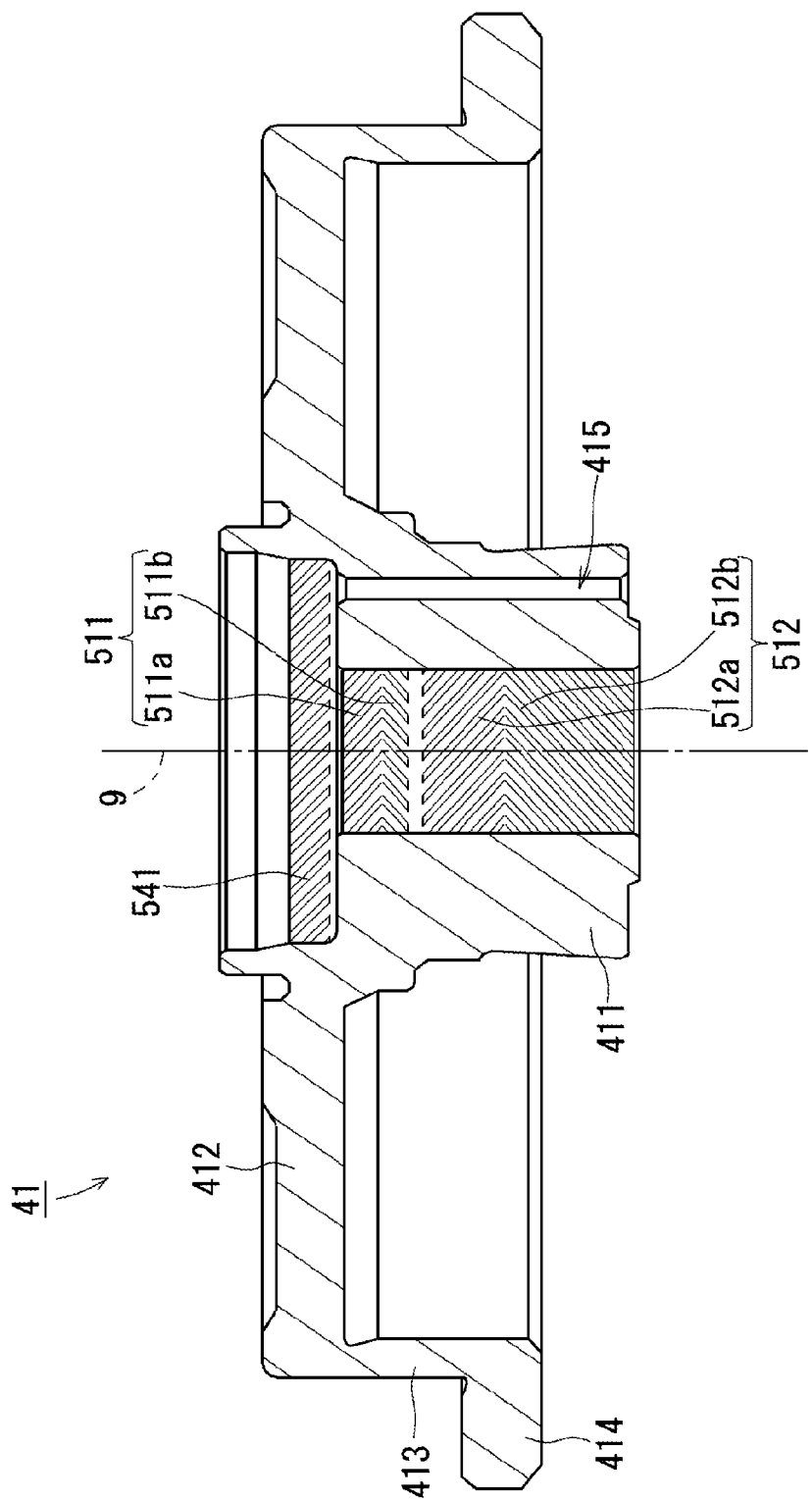
FIG. 5 is a vertical cross-sectional view of the hub.

FIG. 5 is a vertical cross-sectional view of the hub 41. As illustrated in FIG. 5, upper and lower radial dynamic pressure groove arrays 511 and 512 are arranged on the inner circumferential surface of the sleeve portion 411 of the hub 41 to generate a dynamic pressure in the lubricating oil 59 in the first gap 51. Each of the upper and lower radial dynamic pressure groove arrays 511 and 512 is an array of dynamic pressure grooves in a so-called herringbone pattern arranged in a circumferential direction. During the rotation of the hub 41 relative to the shaft 33, a pressure is applied to the lubricating oil 59 in the first gap 51 by the upper and lower radial dynamic pressure groove arrays 511 and 512. The hub 41 is arranged to rotate while being radially supported by the dynamic pressure generated in the lubricating oil 59 in the first gap 51.

Note that the upper and lower radial dynamic pressure groove arrays 511 and 512 may be arranged on the outer circumferential surface of the shaft 33, or on both the inner circumferential surface of the sleeve portion 411 and the outer circumferential surface of the shaft 33, in other preferred embodiments.

As illustrated in FIG. 5, the upper radial dynamic pressure groove array 511 includes a plurality of first grooves 511*a* and a plurality of second grooves 511*b*. The first grooves 511*a* are inclined with respect to the central axis 9 and arranged to cause a downward flow of the lubricating oil 59. The second grooves 511*b* are inclined with respect to the central axis 9 and arranged to cause an upward flow of the lubricating oil 59. The lower radial dynamic pressure groove array 512 includes a plurality of third grooves 512*a* and a plurality of fourth grooves 512*b*. The third grooves 512*a* are inclined with respect to the central axis 9 and arranged to cause a downward flow of the lubricating oil 59. The fourth grooves 512*b* are inclined with respect to the central axis 9 and arranged to cause an upward flow of the lubricating oil 59.

In the present preferred embodiment, the sum of the axial dimension of the second grooves 511*b* and that of the fourth grooves 512*b* is preferably greater than the sum of the axial dimension of the first grooves 511*a* and that of the third grooves 512*a*. Accordingly, an upward pressure generated in the lubricating oil 59 by the second and fourth grooves 511*b* and 512*b* is greater than a downward pressure generated in the lubricating oil 59 by the first and third grooves 511*a* and 512*a*. Therefore, the upper and lower radial dynamic pressure groove arrays 511 and 512 as a whole serve to cause the lubricating oil 59 to flow upward in the first gap 51.

Note that the following arrangements may be applied in other preferred embodiments to cause the lubricating oil 59 to flow upward in the first gap 51. That is, the number of second and fourth grooves may be greater than the number of first and third grooves. Also, the width and/or depth of the second and fourth grooves may be greater than the width and/or depth of the first and third grooves.

Figure 6:
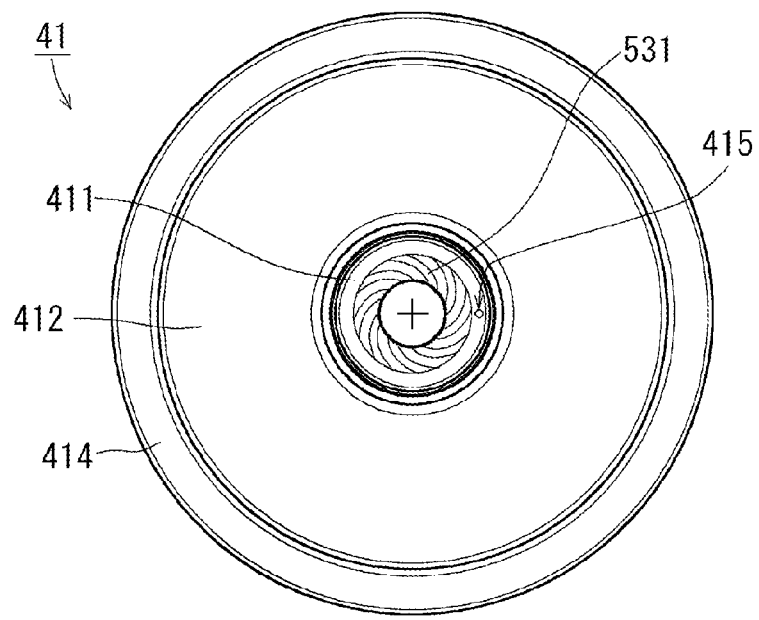
FIG. 6 is a top view of the hub.
Figure 7:
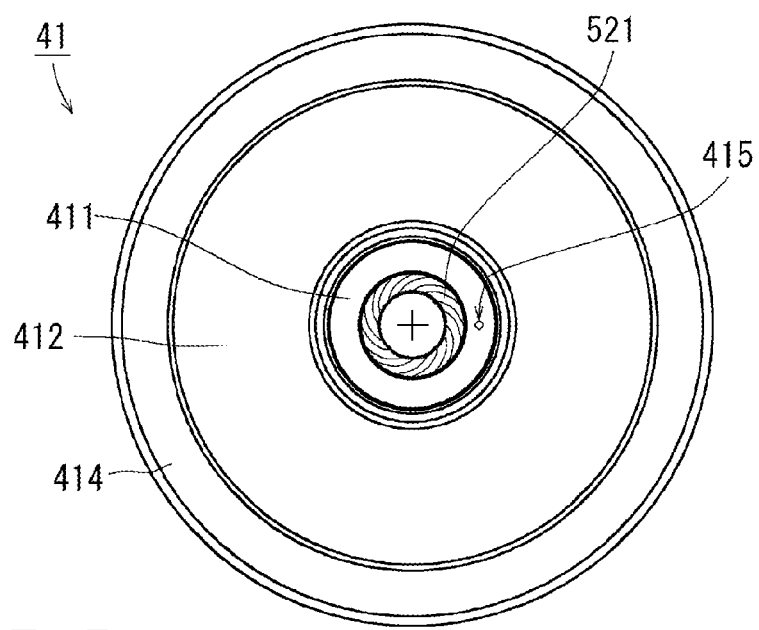
FIG. 7 is a bottom view of the hub.

FIGS. 6 and 7 are a top view and a bottom view, respectively, of the hub 41. As illustrated in FIG. 6, an upper thrust dynamic pressure groove array 531 is arranged on the upper surface of the sleeve portion 411 of the hub 41 to generate a dynamic pressure in the lubricating oil 59 in the third gap 53. As illustrated in FIG. 7, a lower thrust dynamic pressure groove array 521 is arranged on the lower surface of the sleeve portion 411 of the hub 41 to generate a dynamic pressure in the lubricating oil 59 in the second gap 52.

Each of the upper and lower thrust dynamic pressure groove arrays 531 and 521 is an array of dynamic pressure grooves in a spiral pattern centered on the central axis 9 which are arranged in the circumferential direction. During the rotation of the hub 41 relative to the shaft 33, a pressure is applied to the lubricating oil 59 by each of the upper and lower thrust dynamic pressure groove arrays 531 and 521. The hub 41 is arranged to rotate while being axially supported by the dynamic pressure generated in the lubricating oil 59 in relation to the thrust washer 34 and the thrust cup 32.

Note that it is sufficient that the upper thrust dynamic pressure groove array 531 is arranged on at least one of the upper surface of the sleeve portion 411 and the lower surface of the thrust washer 34. Also note that it is sufficient that the lower thrust dynamic pressure groove array 521 is arranged on at least one of the lower surface of the sleeve portion 411 and the upper surface of the annular portion 321 of the thrust cup 32. Also note that each or one of the upper and lower thrust dynamic pressure groove arrays may be defined by an array of dynamic pressure grooves in a herringbone pattern, in other preferred embodiments.

When causing the lubricating oil 59 to have an axial supporting force, each of the upper and lower thrust dynamic pressure groove arrays 531 and 521 causes the lubricating oil 59 to flow radially inward. Meanwhile, as described above, an upward flow of the lubricating oil 59 is caused in the first gap 51. Accordingly, in the third gap 53, both a radially inward flow of the lubricating oil 59 and a radially outward flow of the lubricating oil 59 are caused. A portion of the lubricating oil 59 flowing radially outward in the third gap 53 enters into the through hole 415 to cause a downward flow of the lubricating oil 59 in the through hole 415.

As described above, the lubricating oil 59 is arranged to circulate through the following spaces by flowing therein in the following order: the first gap 51, a portion of the third gap 53 radially inward of the through hole 415, the through hole 415, a portion of the second gap 52 radially inward of the through hole 415, and the first gap 51.

The outer circumferential surface of the thrust washer 34 and the inner circumferential surface of the circular plate portion 412 of the hub 41 are arranged opposite to each other with a gap (hereinafter referred to as a "fourth gap") 54 therebetween. The upper surface of the lubricating oil 59 is located within the fourth gap 54.

As illustrated in FIG. 5, a pumping groove array 541 is arranged on the inner circumferential surface of the circular plate portion 412 of the hub 41. The pumping groove array 541 is arranged to generate a downward pressure in the lubricating oil in the fourth gap 54. During the rotation of the hub 41 relative to the thrust washer 34, a downward pressure is applied to the lubricating oil 59 in the fourth gap 54 by the pumping groove array 541. This pressure induces the lubricating oil 59 to flow toward the lower surface of the thrust washer 34, so that a leakage of the lubricating oil 59 through the fourth gap 54 is prevented.

Note that the pumping groove array 541 may be arranged on the outer circumferential surface of the thrust washer, or on both the inner circumferential surface of the circular plate portion and the outer circumferential surface of the thrust washer. Also note that the pumping groove array may be arranged in a region on the lower surface of the thrust washer or the upper surface of the sleeve portion, which together define the third gap, extending from a portion thereof including the upper end portion (opening) of the through hole to an outermost portion of the lower surface of the thrust washer or an outermost portion of the upper surface of the sleeve portion. That is, the pumping groove array may be arranged in a region in the third gap which includes the upper end portion (opening) of the through hole, or in a region in the third gap radially outward of the upper end portion (opening) of the through hole. In the present preferred embodiment, the pumping groove array serves to pump a portion of the lubricating oil in the vicinity of the upper surface thereof toward an inside of the bearing apparatus during the rotation of the rotating member.

Note that the upper thrust dynamic pressure groove array and the pumping groove array may be defined by a single groove array. In this case, this single groove array is preferably arranged in the region, on the lower surface of the thrust washer or the upper surface of the sleeve portion, extending from the portion thereof including the upper end portion (opening) of the through hole to the outermost portion of the lower surface of the thrust washer or the outermost portion of the upper surface of the sleeve portion.

As illustrated in FIG. 4, an upper capillary seal portion 54a is arranged above the pumping groove array 541. In the upper capillary seal portion 54a, the radial dimension of the fourth gap 54 gradually increases in an upward direction. The upper surface of the lubricating oil 59 is located within the upper capillary seal portion 54a, and attracted downward by surface tension. This contributes to further preventing the leakage of the lubricating oil 59 through the fourth gap 54.

The inner circumferential surface of the cylindrical portion 322 of the thrust cup 32 and the outer circumferential surface of the sleeve portion 411 of the hub 41 are arranged opposite to each other with a gap (hereinafter referred to as a "fifth gap") 55 therebetween. The fifth gap 55 is a space in communication with the second gap 52. The lower surface of the lubricating oil 59 is located within the fifth gap 55. The fifth gap 55 defines a lower capillary seal portion 55a, the radial dimension of which gradually decreases in the downward direction. Accordingly, the lower surface of the lubricating oil 59 is attracted downward by surface tension. This contributes to preventing a leakage of the lubricating oil 59 through the fifth gap 55.

Next, a discharge of air bubbles that have entered into the lubricating oil 59 will now be described below.

Figure 8:
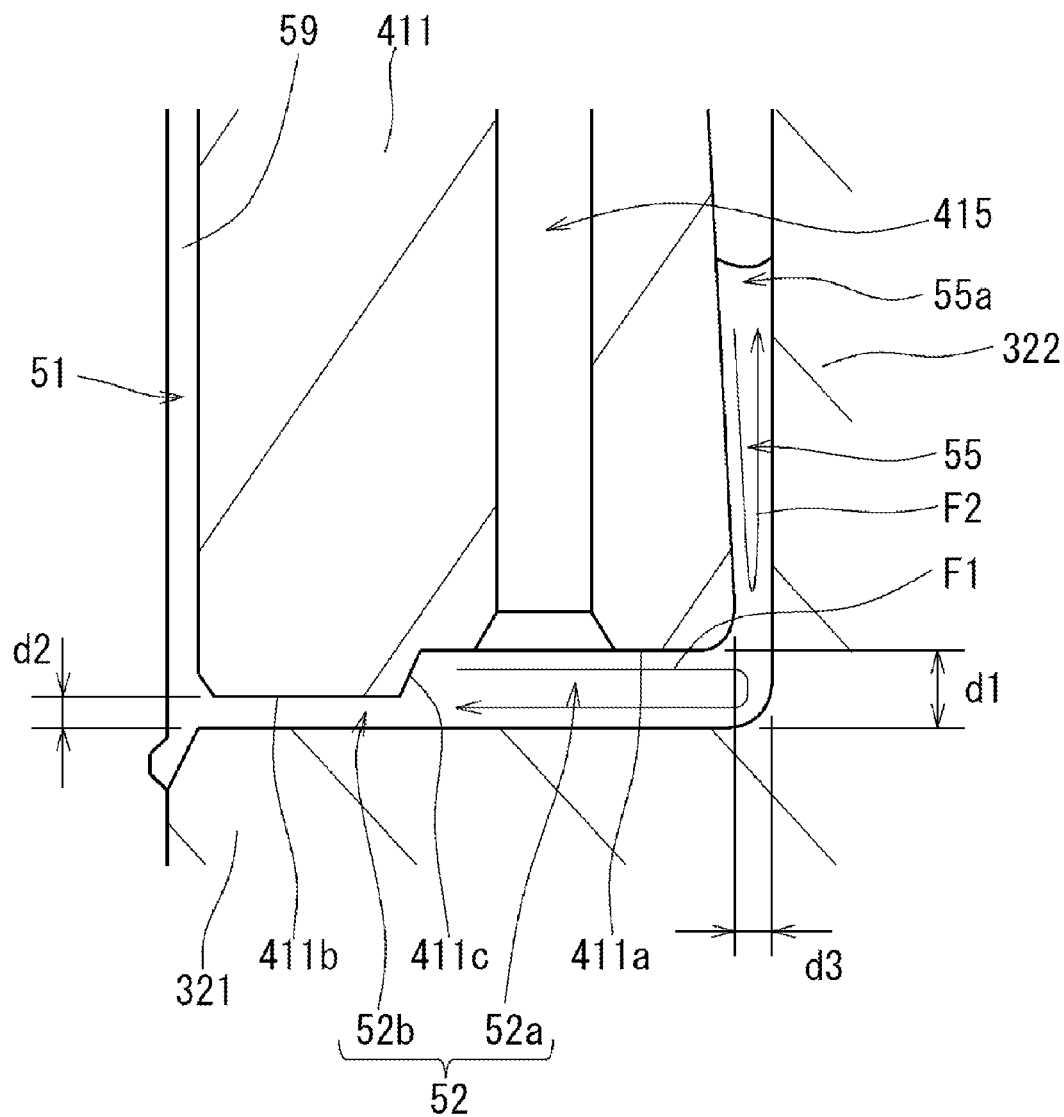
FIG. 8 is an enlarged vertical cross-sectional view of a lower portion of the sleeve portion and its vicinity.

FIG. 8 is an enlarged vertical cross-sectional view of a lower portion of the sleeve portion 411 and its vicinity. As illustrated in FIG. 8, the lower surface of the sleeve portion 411 has a shoulder 411c arranged thereon. The lower surface of the sleeve portion 411 includes a first plane 411a arranged radially outward of the shoulder 411c, and a second plane 411b arranged radially inward of the shoulder 411c. The first plane 411a is arranged at a level higher than that of the second plane 411b.

The second gap 52 includes a first region 52a positioned below the first plane 411a, and a second region 52b positioned below the second plane 411b. As described above, the first plane 411a, which faces the first region 52a, is preferably arranged at a level higher than that of the second plane 411b, which faces the second region 52b. Therefore, the axial dimension d1 of the first region 52a is greater than the axial dimension d2 of the second region 52b.

The second plane 411b preferably has the above-described lower thrust dynamic pressure groove array 521 arranged thereon. Accordingly, the second region 52b is a region where a pressure is applied to the lubricating oil 59 by the lower thrust dynamic pressure groove array 521. On the other hand, the first region 52a is positioned radially outward of the second region 52b, and in communication with the fifth gap 55. The lower end portion of the through hole 415 is open at a location within the first plane 411a and radially outwardly away from the shoulder 411c.

While the hub 41 rotates relative to the thrust cup 32, a portion of the lubricating oil 59 within the first region 52a which spreads near and along the first plane 411a is caused to flow radially outward by a centrifugal force accompanying the rotation of the sleeve portion 411. On the other hand, in reaction thereto, the remaining portion of the lubricating oil 59 within the first region 52a is caused to flow radially inward. As a result, the local circulation F1 of the lubricating oil 59 arises within the first region 52a.

If the axial dimension d1 of the first region 52a is excessively small, the local circulation F1 is unlikely to be generated. On the other hand, if the axial dimension d1 of the first region 52a is so great that the area of an axially extending surface with which the lubricating oil 59 is in contact is greater than the area of a radially spreading surface with which the lubricating oil 59 is in contact, a frictional resistance between the axially extending surface and the lubricating oil 59 may exceed the potential of a centrifugal force accompanying the rotation of the radially spreading surface to cause a circulation of the lubricating oil 59, resulting in the circulation of the lubricating oil 59 becoming unlikely to arise. Therefore, in order to ensure an excellent local circulation F1 of the lubricating oil 59, it is desirable to set the axial dimension d1 of the first region 52a appropriately. Specifically, the axial dimension d1 is preferably about 50 μm or greater, more preferably in the range of about 50 μm to about 200 μm, for example.

A portion of the lubricating oil 59 which has entered into the first region 52a through the lower end portion (opening) of the through hole 415 is caused to flow radially outward by the circulation F1 within the first region 52a. Accordingly, in the case where this portion of the lubricating oil 59 contains any air bubbles, these air bubbles will also be carried radially outward along with the lubricating oil 59. Notice here that the lower end portion of the through hole 415 is not arranged adjacent to the shoulder 411c but open at the location radially outwardly away from the shoulder 411c. This arrangement helps any air bubbles that have flowed from the through hole 415 into the first region 52a to ride on a flow of the local circulation F1, so that the air bubbles within the lubricating oil 59 are carried to a vicinity of a lower end portion of the fifth gap 55 while riding on the flow of the local circulation F1. Accordingly, any air bubbles will be carried from the first region 52a into the fifth gap 55 and then discharged out of the bearing apparatus through the surface of the lubricating oil 59 within the fifth gap 55.

Moreover, in the present preferred embodiment, the outer circumferential surface of the sleeve portion 411 includes an inclined surface which gradually decreases in a diameter in the upward direction. While the hub 41 rotates relative to the thrust cup 32, a portion of the lubricating oil 59 within the fifth gap 55 which spreads near and along the outer circumferential surface of the sleeve portion 411 is accordingly caused to flow downward by a centrifugal force accompanying the rotation of the sleeve portion 411. On the other hand, in reaction thereto, the remaining portion of the lubricating oil 59 within the fifth gap 55 is caused to flow upward. As a result, a local circulation F2 of the lubricating oil 59 arises within the fifth gap 55.

The local circulation F2 within the fifth gap 55 catches any air bubbles which have been carried from the first region 52a to the vicinity of the lower end portion of the fifth gap 55, and then carries the caught air bubbles to the surface of the lubricating oil 59. As a result, the air bubbles are discharged out of the bearing apparatus through the surface of the lubricating oil 59 within the fifth gap 55.

Furthermore, in the present preferred embodiment, the radial dimension d3 of the lower end portion of the fifth gap 55 is preferably smaller than the axial dimension d1 of the first region 52a. In the lower capillary seal portion 55a, the surface of the lubricating oil 59 is retained at a position where a pressure of the lubricating oil 59 and the surface tension of the surface of the lubricating oil 59 balance each other. Therefore, if the radial dimension d3 of the lower end portion of the fifth gap 55 were excessively great, the position of the surface of the lubricating oil 59 within the fifth gap 55 might be unstable. In the present preferred embodiment, the radial dimension d3 of the lower end portion of the fifth gap 55 is sufficiently small to achieve a stable retention of the surface of the lubricating oil 59 within the lower capillary seal portion 55a. In addition, the axial dimension d1 of the first region 52a is sufficiently large to ensure the local circulation F1 within the first region 52a.

Furthermore, in the present preferred embodiment, the pumping groove array 541 is arranged on the inner circumferential surface of the circular plate portion 412 of the hub 41 in order to retain the upper surface of the lubricating oil 59. When the pumping groove array 541 is provided to retain the upper surface of the lubricating oil 59, it is easy to achieve a balance in pressure between the upper and lower surfaces of the lubricating oil 59, and moreover, it is possible to reduce the axial dimension of the fluid dynamic bearing apparatus 5 as compared to the case where both the upper and lower surfaces of the lubricating oil 59 are retained only by tapered seals. However, the pumping groove array 541 is likely to introduce air bubbles into the lubricating oil 59. Therefore, the above-described structure arranged to discharge any air bubbles through the lower surface of the lubricating oil 59 has particularly great technological significance in the fluid dynamic bearing apparatus 5 provided with the pumping groove array 541 according to the present preferred embodiment.

While preferred embodiments of the present invention have been described above, it will be understood that the present invention is not limited to the above-described preferred embodiments.

Figure 9:
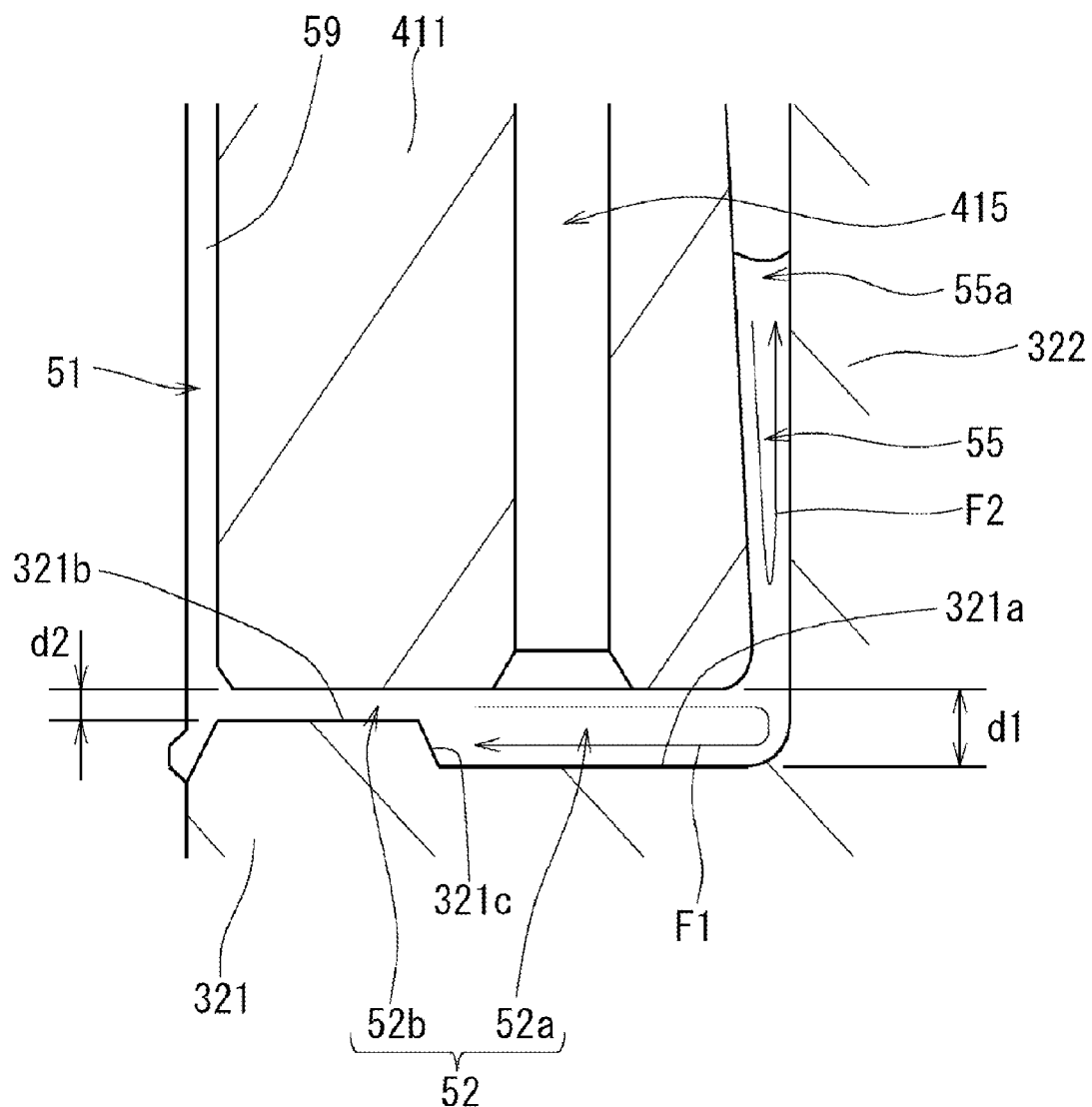
FIG. 9 is an enlarged vertical cross-sectional view of a lower portion of a sleeve portion and its vicinity according to a preferred embodiment of the present invention.

For example, referring to FIG. 9, a shoulder 321c may be arranged on the upper surface of the annular portion 321 of the thrust cup 32 in other preferred embodiments. In FIG. 9, the upper surface of the annular portion 321 includes a first plane 321a arranged radially outward of the shoulder 321c, and a second plane 321b arranged radially inward of the shoulder 321c. In addition, the first plane 321a is arranged at a level lower than that of the second plane 321b. With this arrangement also, the axial dimension d1 of the first region 52a above the first plane 321a is preferably greater than the axial dimension d2 of the second region 52b above the second plane 321b, so that the local circulation F1 of the lubricating oil 59 can arise in the first region 52a.

Note here that the shoulder 411c or 321c is preferably arranged in one of the hub 41 and the thrust cup 32 which has the lower hardness of the two. This is in order to prevent the shoulder 411c or 321c from damaging any surface of the lower-hardness member, i.e., the hub 41 or the thrust cup 32, when the lower surface of the sleeve portion 411 of the hub 41 is brought into contact with the upper surface of the annular portion 321 of the thrust cup 32.

Figure 10:
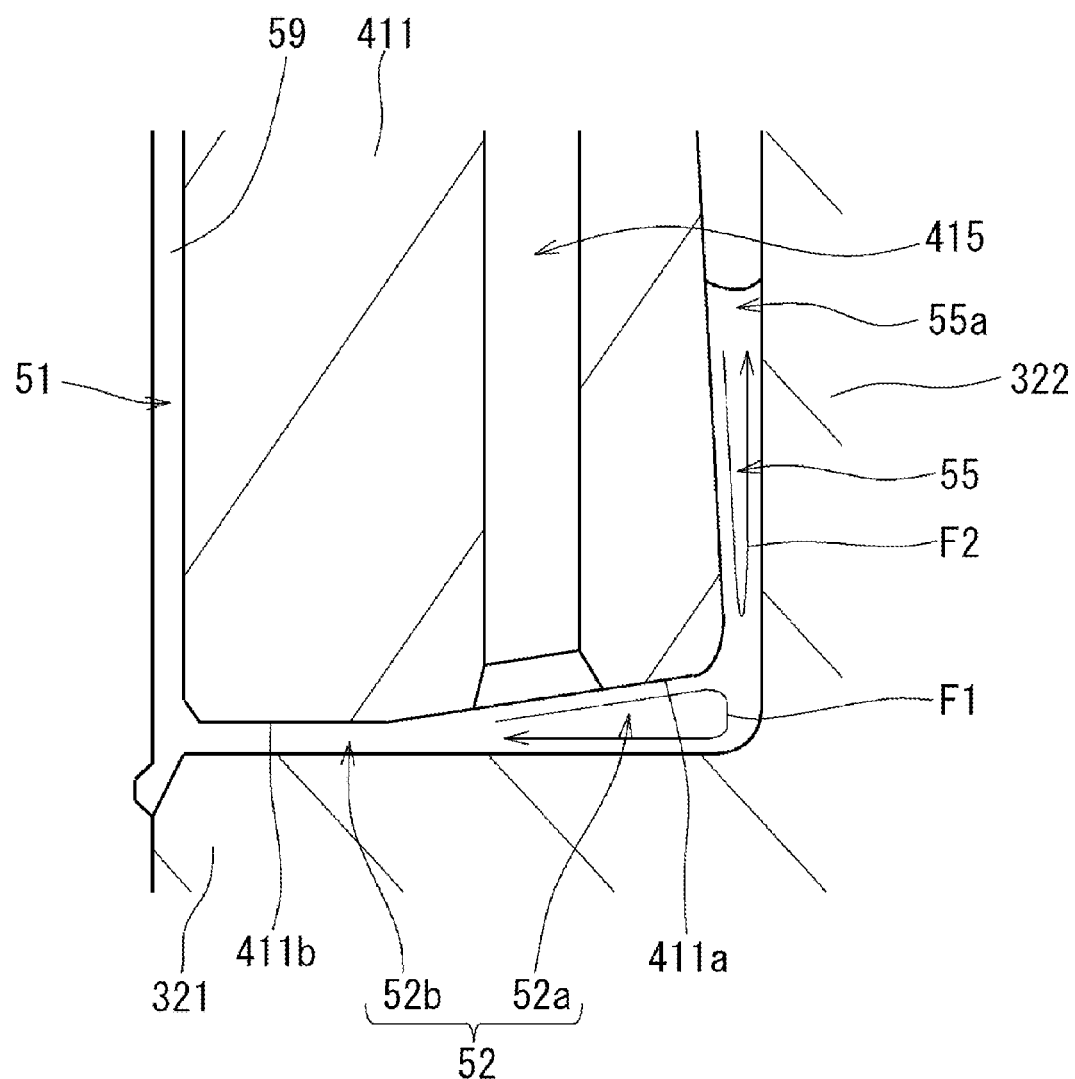
FIG. 10 is an enlarged vertical cross-sectional view of a lower portion of a sleeve portion and its vicinity according to a preferred embodiment of the present invention.

Also, referring to FIG. 10, the first region 52a may be a tapered space whose axial dimension gradually increases in a radially outward direction, in other preferred embodiments. Specifically, the first plane 411a of the hub 41 may be an inclined surface whose level becomes progressively higher in the radially outward direction. Alternatively, the first plane 321a of the thrust cup 32 may be an inclined surface whose level becomes progressively lower in the radially outward direction. The lower thrust dynamic pressure groove array 521 is not only capable of causing a flow of the lubricating oil 59 within the second region 52b, but also capable of causing a flow of the lubricating oil 59 within a region in the vicinity of the boundary between the first and second regions 52a and 52b, the region extending across the boundary both radially outward and inward. This contributes to reducing an area in the vicinity of the boundary between the first and second regions 52a and 52b where a portion of the lubricating oil 59 resides, and thereby reducing the likelihood of a residence of any air bubbles, resulting in an additional improvement in efficiency in the discharge of air bubbles.

Figure 11:
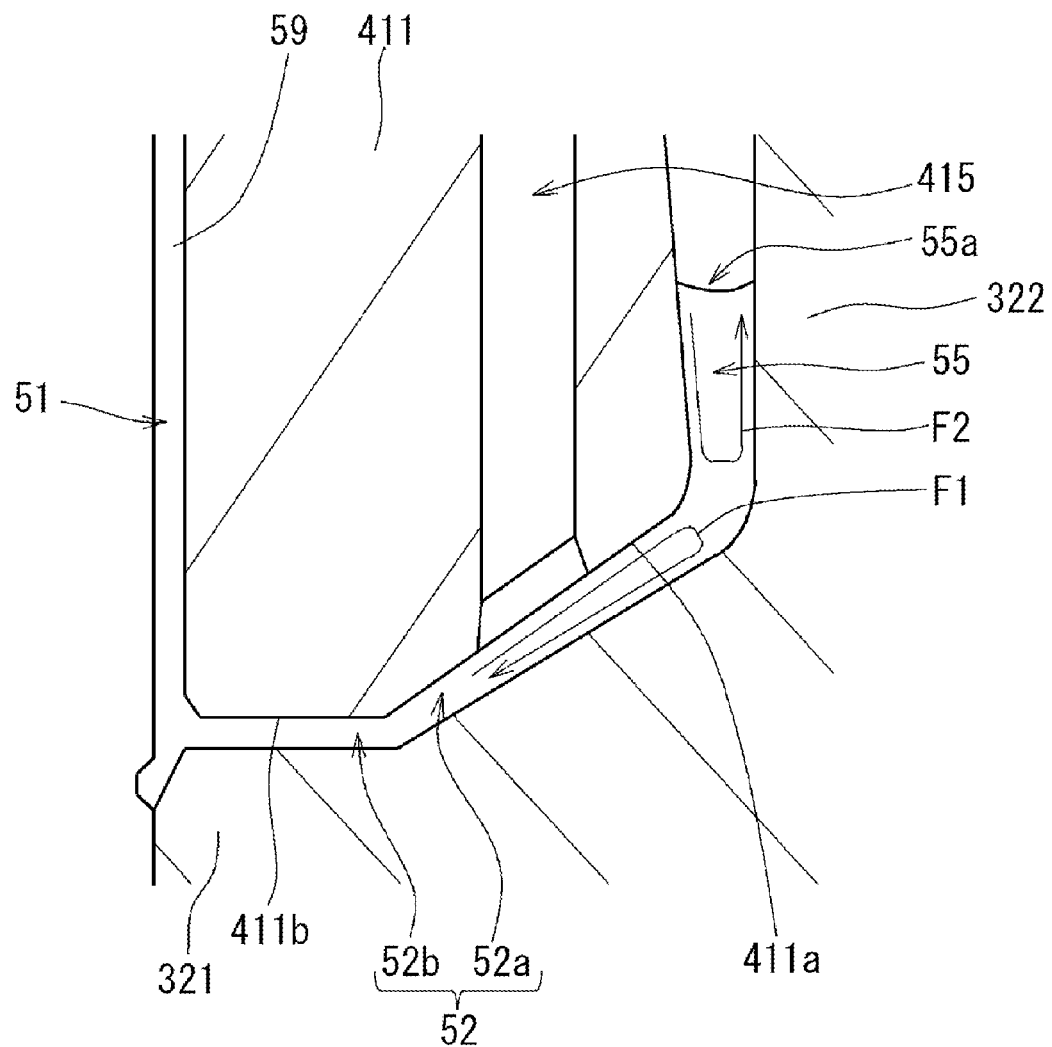
FIG. 11 is an enlarged vertical cross-sectional view of a lower portion of a sleeve portion and its vicinity according to a preferred embodiment of the present invention.

Also, referring to FIG. 11, the first region 52a and the fifth gap 55 may gradually increase in a width from the boundary between the first and second regions 52a and 52b to the lower surface of the lubricating oil 59 within the fifth gap 55, in other preferred embodiments. In this case, it is possible to reduce the likelihood of a residence of any air bubbles in the vicinity of a boundary between the first region 52a and the fifth gap 55, and accordingly further improve the efficiency in the discharge of air bubbles.

Figure 12:
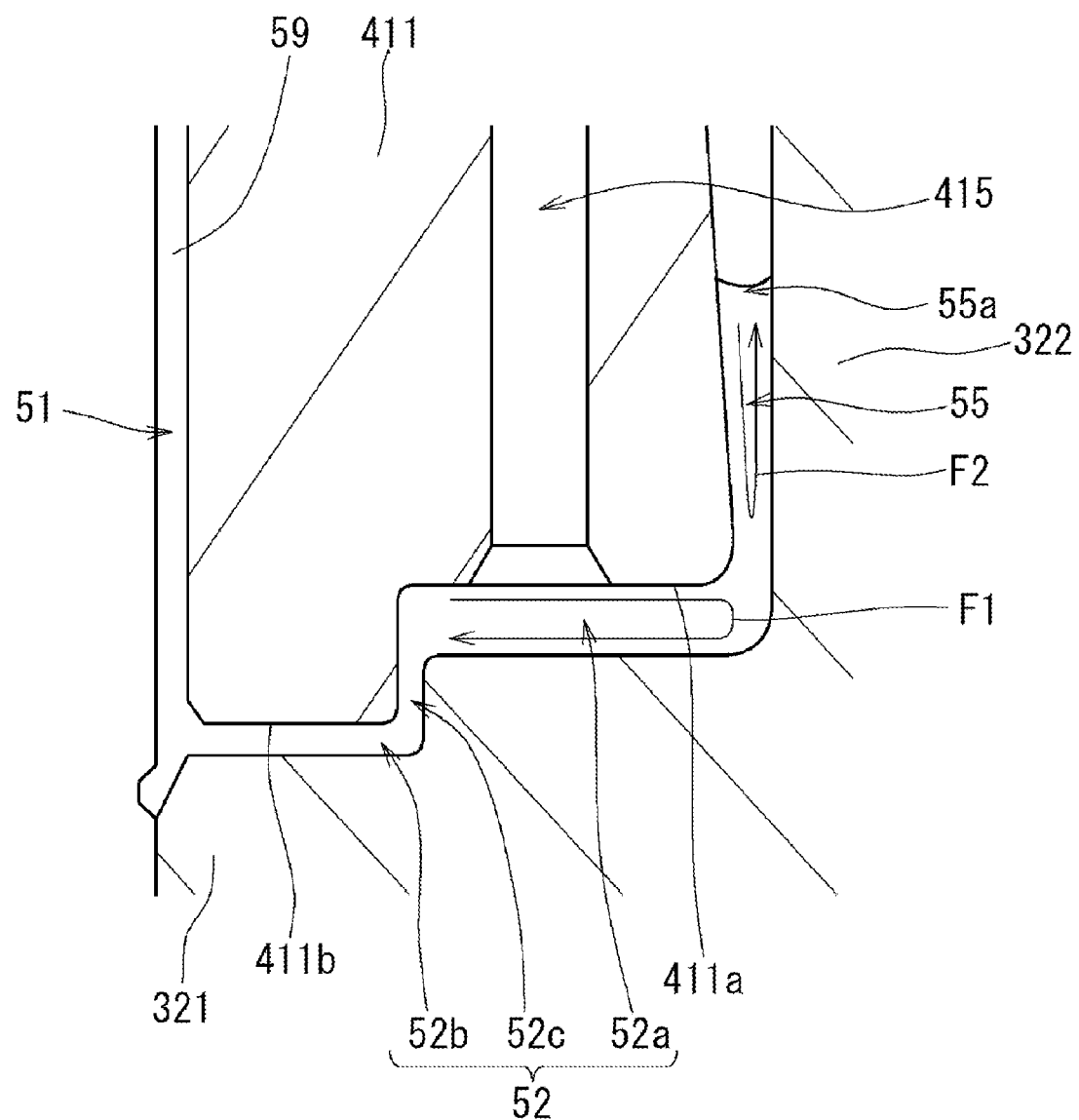
FIG. 12 is an enlarged vertical cross-sectional view of a lower portion of a sleeve portion and its vicinity according to a preferred embodiment of the present invention.

Also, referring to FIG. 12, a third region 52c extending in the axial direction may be arranged between the first and second regions 52a and 52b in other preferred embodiments. Specifically, it may be so arranged that shoulders are arranged in both the annular portion 321 of the thrust cup 32 and the sleeve portion 411 of the hub 41, and that these two shoulders are arranged radially opposite to each other with the third region 52c therebetween. In the third region 52c, the lubricating oil 59 is hindered from flowing except in the circumferential direction. This contributes to preventing any air bubbles from traveling from the first region 52a into the second region 52b, and thereby preventing the air bubbles from entering into the vicinity of any of the lower thrust dynamic pressure groove array 521 and the upper and lower radial dynamic pressure groove arrays 511 and 512.

Also, in addition to the structure according to any of the above-described preferred embodiments and their modifications, an additional groove array may be arranged on a portion of the upper surface of the annular portion 321 of the thrust cup 32 which faces the first region 52a to cause the lubricating oil 59 to flow radially inward. The additional groove array is preferably in a spiral pattern, for example, but any other desirable pattern could be used. The provision of this groove array leads to an active radially inward flow of a portion of the lubricating oil 59 which spreads near and along the groove array, thereby facilitating the occurrence of the local circulation F1 within the first region 52a.

As described above, a bearing apparatus according to a preferred embodiment of the present invention is applicable to a spindle motor for use in a magnetic disk apparatus. The spindle motor for use in the magnetic disk apparatus requires a particularly excellent rotation performance of the bearing apparatus. Therefore, the application of the bearing apparatus according to a preferred embodiment of the present invention to the spindle motor for use in the magnetic disk apparatus has great technological significance. A bearing apparatus according to a preferred embodiment of the present invention is also applicable to a spindle motor designed to rotate other types of disks, such as an optical disk or the like.

The present invention finds applications in bearing apparatuses, spindle motors, and disk drive apparatuses.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A bearing apparatus comprising:
 a shaft arranged along a central axis and extending in a vertical direction;
 a thrust cup including an annular portion extending radially outward from an outer circumferential surface of the shaft, and a cylindrical portion projecting upward from an outer edge portion of the annular portion;
 a substantially annular thrust washer extending radially outward from the outer circumferential surface of the shaft;

a rotating member arranged above the thrust cup and rotatably supported around the shaft; and
a lubricating oil; wherein
the rotating member includes a through hole extending in an axial direction, an axially lowermost portion of the through hole including a circumferentially chamfered portion;
the lubricating oil is arranged to fill a space including the through hole, a first gap defined between the outer circumferential surface of the shaft and a portion of the rotating member which is arranged radially opposite to the outer circumferential surface of the shaft, a second gap defined between a lower surface of the rotating member and an upper surface of the annular portion, and a third gap defined between a lower surface of the thrust washer and an upper surface of the rotating member;
at least one of the outer circumferential surface of the shaft and the portion of the rotating member which is arranged radially opposite to the outer circumferential surface of the shaft includes a plurality of dynamic pressure grooves arranged thereon to generate a dynamic pressure in a portion of the lubricating oil which is present in the first gap during rotation of the rotating member, and to cause the portion of the lubricating oil which is present in the first gap to flow upward in the first gap;
an outer circumferential surface of the rotating member and an inner circumferential surface of the cylindrical portion together define a lower capillary seal portion in communication with the space and including a radial dimension gradually decreasing in a downward direction, the lower capillary seal portion including a lower surface of the lubricating oil located therewithin;
the second gap includes a first region in communication with the lower capillary seal portion, and a second region positioned radially inward of the first region and including an axial dimension smaller than that of the first region;
the through hole includes an upper end portion in communication with the first gap, and a lower end portion open at a location radially outwardly away from a boundary between the first region and the second region;
an outer circumferential surface of the thrust washer and an inner circumferential surface of the rotating member together define an upper capillary seal portion in communication with the space and including a radial dimension gradually decreasing in the downward direction, the upper capillary seal portion including an upper surface of the lubricating oil located therewithin;
a pumping groove is arranged on at least one of the upper surface and the inner circumferential surface of the rotating member and the outer circumferential surface and the lower surface of the thrust washer to pump a portion of the lubricating oil in a vicinity of the upper surface of the lubricating oil toward an inside of the bearing apparatus;
a first edge is arranged at a boundary between the axially lowermost portion of the through hole and an axially lower surface of the rotating member, and a second edge is arranged at a boundary between a sloping portion and one of an axially lowermost surface of the rotating member and an axially uppermost surface of the annular member; and
the first edge is arranged to face the first region and the second edge is arranged to face the second region, and the first edge is arranged radially outward from the second edge.

2. The bearing apparatus according to claim 1, wherein one of the thrust cup and the rotating member includes a first plane facing the first region, a shoulder, and a second plane facing the second region and arranged radially inward of the first plane with the shoulder between the first plane and the second plane.

3. The bearing apparatus according to claim 2, wherein the lower end portion of the through hole is open at a location spaced radially outwardly away from the shoulder.

4. The bearing apparatus according to claim 2, wherein the axial dimension of the first region is at least about 50 μm.

5. The bearing apparatus according to claim 2, wherein the first plane and the second plane and the shoulder are included in a one of the thrust cup and the rotating member which has a lowest hardness.

6. The bearing apparatus according to claim 5, wherein the axial dimension of the first region is at least about 50 μm.

7. The bearing apparatus according to claim 1, wherein the axial dimension of the first region gradually increases in a radially outward direction.

8. The bearing apparatus according to claim 7, wherein the first region and the lower capillary seal portion gradually increase in a width from the boundary between the first region and the second region to the lower surface of the lubricating oil.

9. The bearing apparatus according to claim 1, wherein a radial dimension of a lower end portion of the lower capillary seal portion is smaller than the axial dimension of the first region.

10. The bearing apparatus according to claim 1, wherein the second gap further includes a third region extending in the axial direction and arranged between the first region and the second region.

11. The bearing apparatus according to claim 1, wherein at least one of a portion of the lower surface of the rotating member and a portion of the upper surface of the annular portion which together define the second region includes a plurality of dynamic pressure grooves arranged thereon to, during the rotation of the rotating member, generate a dynamic pressure in a portion of the lubricating oil which is present in the second region so that the portion of the lubricating oil which is present in the second region flows radially inward.

12. The bearing apparatus according to claim 1, wherein
at least one of the lower surface of the thrust washer and the upper surface of the rotating member includes a plurality of dynamic pressure grooves arranged thereon to generate, during the rotation of the rotating member, a dynamic pressure in a portion of the lubricating oil which is present in the third gap so that the portion of the lubricating oil which is present in the third gap receives a pressure which induces the lubricating oil to flow radially inward therein; and
the pressure inducing the lubricating oil to flow radially inward in the third gap is smaller than a pressure caused in the first gap to induce the lubricating oil to flow upward therein.

13. The bearing apparatus according to claim 1, wherein
the plurality of dynamic pressure grooves arranged in the first gap include an upper radial dynamic pressure groove array and a lower radial dynamic pressure groove array;
the upper radial dynamic pressure groove array includes a plurality of first grooves inclined with respect to the central axis and arranged to cause a downward flow of the lubricating oil, and a plurality of second grooves inclined with respect to the central axis and arranged to cause an upward flow of the lubricating oil;

the lower radial dynamic pressure groove array includes a plurality of third grooves inclined with respect to the central axis and arranged to cause a downward flow of the lubricating oil, and a plurality of fourth grooves inclined with respect to the central axis and arranged to cause an upward flow of the lubricating oil; and a sum of an axial dimension of the second grooves and an axial dimension of the fourth grooves is greater than a sum of an axial dimension of the first grooves and an axial dimension of the third grooves.

14. A spindle motor comprising:
the bearing apparatus of claim 1;
a stationary portion including the shaft and the thrust cup;
a rotating portion including the rotating member and a support portion arranged to support a disk, the rotating portion being supported through the bearing apparatus of claim 1 to be rotatable with respect to the stationary portion; and
a torque generating portion arranged to produce a torque centered on the central axis between the stationary and rotating portions.

15. A disk drive apparatus comprising:
the spindle motor of claim 14;
an access portion arranged to read and/or write information from or to the disk supported by the rotating portion of the spindle motor; and
a housing arranged to contain the spindle motor and the access portion.

16. A bearing apparatus comprising:
a shaft arranged along a central axis and extending in a vertical direction;
a thrust cup including an annular portion extending radially outward from an outer circumferential surface of the shaft, and a cylindrical portion projecting upward from an outer edge portion of the annular portion;
a substantially annular thrust washer extending radially outward from the outer circumferential surface of the shaft;
a rotating member arranged above the thrust cup and rotatably supported around the shaft; and
a lubricating oil; wherein
the rotating member includes a through hole extending in an axial direction;
the lubricating oil is arranged to fill a space including the through hole, a first gap defined between the outer circumferential surface of the shaft and a portion of the rotating member which is arranged radially opposite to the outer circumferential surface of the shaft, a second gap defined between a lower surface of the rotating member and an upper surface of the annular portion, and a third gap defined between a lower surface of the thrust washer and an upper surface of the rotating member;
at least one of the outer circumferential surface of the shaft and the portion of the rotating member which is arranged radially opposite to the outer circumferential surface of the shaft includes a plurality of dynamic pressure grooves arranged thereon to generate a dynamic pressure in a portion of the lubricating oil which is present in the first gap during rotation of the rotating member, and to cause the portion of the lubricating oil which is present in the first gap to flow upward in the first gap;
an outer circumferential surface of the rotating member and an inner circumferential surface of the cylindrical portion together define a lower capillary seal portion in communication with the space and including a radial dimension gradually decreasing in a downward direction, the lower capillary seal portion including a lower surface of the lubricating oil located therewithin;

the second gap includes a first region in communication with the lower capillary seal portion, and a second region positioned radially inward of the first region and including an axial dimension smaller than that of the first region;

the through hole includes an upper end portion in communication with the first gap, and a lower end portion open at a location radially outwardly away from a boundary between the first region and the second region;

an outer circumferential surface of the thrust washer and an inner circumferential surface of the rotating member together define an upper capillary seal portion in communication with the space and including a radial dimension gradually decreasing in the downward direction, the upper capillary seal portion including an upper surface of the lubricating oil located therewithin;

a pumping groove is arranged on at least one of the upper surface and the inner circumferential surface of the rotating member and the outer circumferential surface and the lower surface of the thrust washer to pump a portion of the lubricating oil in a vicinity of the upper surface of the lubricating oil toward an inside of the bearing apparatus; and a straight planar surface which is axially higher than an axially lower surface of the annular portion is provided in the annular portion, the straight planar surface being arranged radially between the axially lower surface of the annular portion and the cylindrical portion.

17. The bearing apparatus according to claim 16, wherein one of the thrust cup and the rotating member includes a first plane facing the first region, a shoulder, and a second plane facing the second region and arranged radially inward of the first plane with the shoulder between the first plane and the second plane.

18. The bearing apparatus according to claim 17, wherein the lower end portion of the through hole is open at a location spaced radially outwardly away from the shoulder.

19. The bearing apparatus according to claim 16, wherein the first region and the lower capillary seal portion gradually increase in a width from the boundary between the first region and the second region to the lower surface of the lubricating oil.

20. The bearing apparatus according to claim 16, wherein at least one of a portion of the lower surface of the rotating member and a portion of the upper surface of the annular portion which together define the second region includes a plurality of dynamic pressure grooves arranged thereon to, during the rotation of the rotating member, generate a dynamic pressure in a portion of the lubricating oil which is present in the second region so that the portion of the lubricating oil which is present in the second region flows radially inward.

21. The bearing apparatus according to claim 16, wherein at least one of the lower surface of the thrust washer and the upper surface of the rotating member includes a plurality of dynamic pressure grooves arranged thereon to generate, during the rotation of the rotating member, a dynamic pressure in a portion of the lubricating oil which is present in the third gap so that the portion of the lubricating oil which is present in the third gap receives a pressure which induces the lubricating oil to flow radially inward therein; and the pressure inducing the lubricating oil to flow radially inward in the third gap is smaller than a pressure caused in the first gap to induce the lubricating oil to flow upward therein.

22. The bearing apparatus according to claim 16, wherein
the plurality of dynamic pressure grooves arranged in the first gap include an upper radial dynamic pressure groove array and a lower radial dynamic pressure groove array;
the upper radial dynamic pressure groove array includes a plurality of first grooves inclined with respect to the central axis and arranged to cause a downward flow of the lubricating oil, and a plurality of second grooves inclined with respect to the central axis and arranged to cause an upward flow of the lubricating oil;
the lower radial dynamic pressure groove array includes a plurality of third grooves inclined with respect to the central axis and arranged to cause a downward flow of the lubricating oil, and a plurality of fourth grooves inclined with respect to the central axis and arranged to cause an upward flow of the lubricating oil; and
a sum of an axial dimension of the second grooves and an axial dimension of the fourth grooves is greater than a sum of an axial dimension of the first grooves and an axial dimension of the third grooves.

23. A spindle motor comprising:
the bearing apparatus of claim 16;
a stationary portion including the shaft and the thrust cup;
a rotating portion including the rotating member and a support portion arranged to support a disk, the rotating portion being supported through the bearing apparatus of claim 1 to be rotatable with respect to the stationary portion; and
a torque generating portion arranged to produce a torque centered on the central axis between the stationary and rotating portions.

24. A disk drive apparatus comprising:
the spindle motor of claim 23;
an access portion arranged to read and/or write information from or to the disk supported by the rotating portion of the spindle motor; and
a housing arranged to contain the spindle motor and the access portion.

25. The bearing apparatus according to claim 16, wherein
an axially lowermost portion of the through hole includes a circumferentially chamfered portion;
a first edge is arranged at a boundary between the axially lowermost portion of the through hole and an axially lower surface of the rotating member, and a second edge is arranged at a boundary between a sloping portion and one of an axially lowermost surface of the rotating member or an axially uppermost surface of the annular member; and
the first edge is arranged to face the first region and the second edge is arranged to face the second region, and the first edge is arranged radially outward from the second edge.

26. The bearing apparatus according to claim 16, wherein the thrust cup includes a first shoulder arranged on an axially upper surface of the annular portion and the rotating member includes a second shoulder arranged on an axially lower surface thereof, the first shoulder and the second shoulder being opposed to each other in the radial direction to define a third region therebetween.

* * * * *